US012609808B2

(12) United States Patent
Hoshizuki et al.

(10) Patent No.: US 12,609,808 B2
(45) Date of Patent: Apr. 21, 2026

(54) ENCRYPTION PROCESSING APPARATUS AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 66 days.

(21) Appl. No.: 18/638,240

(22) Filed: Apr. 17, 2024

(65) Prior Publication Data

US 2024/0297779 A1     Sep. 5, 2024

Related U.S. Application Data

(63) Continuation of application No. PCT/JP2022/033394, filed on Sep. 6, 2022.

(30) Foreign Application Priority Data

Oct. 20, 2021     (JP) ................................. 2021-171613

(51) Int. Cl.
H04L 9/00          (2022.01)
H04L 9/06          (2006.01)
H04L 9/30          (2006.01)

(52) U.S. Cl.
CPC ............ H04L 9/008 (2013.01); H04L 9/0618 (2013.01); H04L 9/3093 (2013.01)

(58) Field of Classification Search
CPC ........... G06F 17/10; G06F 21/60; G09C 1/00; H04L 9/008; H04L 9/0618; H04L 9/30; H04L 9/3093
See application file for complete search history.

(56) References Cited

U.S. PATENT DOCUMENTS

| | | | |
|---|---|---|---|
| 9,083,526 B2 * | 7/2015 | Gentry | ................... H04L 9/008 |
| 9,306,738 B2 * | 4/2016 | Loftus | ................... H04L 9/0852 |

(Continued)

FOREIGN PATENT DOCUMENTS

JP          2021-083038 A          5/2021

OTHER PUBLICATIONS

International Search Report issued in PCT/JP2022/033394 on Nov. 22, 2022 (9 pages).

(Continued)

*Primary Examiner* — Sharon S Lynch
(74) *Attorney, Agent, or Firm* — Osha Bergman Watanabe & Burton LLP

(57)          ABSTRACT

An encryption processing apparatus processes a ciphertext. The ciphertext is a fully homomorphic cyphertext that has, as a plaintext associated with an integer, a value obtained by adding an error with a predetermined variance to a predetermined value and that is able to be subjected to a predetermined operation between integers without being decrypted. The apparatus includes a processor that performs a calculation process of applying a predetermined polynomial to a ciphertext. The calculation process performs a first process of reducing an error of an input ciphertext by using the predetermined polynomial and a second process of extracting the new ciphertext from a ciphertext obtained as a result of the first process. The calculation process computes the new ciphertext that is different in input value at high speed by performing the second process a plurality of number of times on the ciphertext obtained as the result of the first process.

6 Claims, 8 Drawing Sheets

(56) References Cited

U.S. PATENT DOCUMENTS

| | | | | |
|---|---|---|---|---|
| 9,716,590 | B2 * | 7/2017 | Gentry | H04L 9/3093 |
| 10,211,975 | B2 * | 2/2019 | Loftus | H04L 9/008 |
| 11,991,266 | B2 * | 5/2024 | Joye | H04L 9/3093 |
| 2013/0170640 | A1 * | 7/2013 | Gentry | H04L 9/008 380/30 |
| 2014/0177828 | A1 * | 6/2014 | Loftus | H04L 9/0852 380/44 |
| 2015/0358153 | A1 * | 12/2015 | Gentry | H04L 9/3093 380/30 |
| 2016/0191233 | A1 * | 6/2016 | Loftus | H04L 9/0852 713/189 |
| 2018/0375639 | A1 * | 12/2018 | Lauter | H04L 9/008 |
| 2021/0328766 | A1 * | 10/2021 | No | H04L 9/3093 |
| 2023/0396409 | A1 * | 12/2023 | Joye | G06N 3/048 |
| 2024/0022395 | A1 * | 1/2024 | Hoshizuki | G06F 21/60 |
| 2024/0039693 | A1 * | 2/2024 | Hoshizuki | H04L 9/0618 |
| 2024/0154786 | A1 * | 5/2024 | Hoshizuki | H04L 9/0618 |
| 2024/0267222 | A1 * | 8/2024 | Chillotti | H04L 9/008 |

OTHER PUBLICATIONS

Written Opinion of the International Searching Authority issued in PCT/JP2022/033394 on Nov. 22, 2022 (4 pages).

Notice of Reasons for Refusal issued in Japanese Patent Application No. 2021-171613, mailed Nov. 22, 2022 (16 pages).

Carpov, S., Izabachene, M. and Mollimard, V.; "New techniques for Multi-value input Homomorphic Evaluation and Applications", Cryptology ePrint Archive, Paper 2018/622, Mar. 9, 2019: 144812, [online], Mar. 9, 2019, pp. 1-20, <URL: https://eprint.iacr.org/2018/622/20190309:144812> (22 pages).

Bourse, F. et al.; "Fast Homomorphic Evaluation of Deep Discretized Neural Networks", Lecture Notes in Computer Science, vol. 10993, 2018, pp. 483-512 (30 pages).

Guimaraes, A., Borin, E. and Aranha, D. F.; "Revisiting the functional bootstrap in TFHE", IACR Transactions on Cryptographic Hardware and Embedded Systems, Feb. 23, 2021, vol. 2021 No. 2, pp. 229-253, <DOI:10.46585/tches.v2021.12.229-253> (25 pages).

Chillotti, I. et al.; "TFHE: Fast Fully Homomorphic Encryption over the Torus", Cryptology ePrint Archive, Paper 2018/420, Apr. 2, 2019:093245, [online], Apr. 2, 2019, pp. 1-62, <URL:https://eprint.iacr.org/archive/2018/421/20190402:093245> (64 pages).

Okada, H., Kiyomoto, S. and Cid, C.; "Integer-Wise Functional Bootstrapping on TFHE: Applications in Secure Integer Arithmetics", Information [online], Jul. 26, 2021, 2021, 12,297, pp. 1-18, <URL:https://doi.org/10.3390/info12080297> (18 pages).

* cited by examiner

FIG.8A

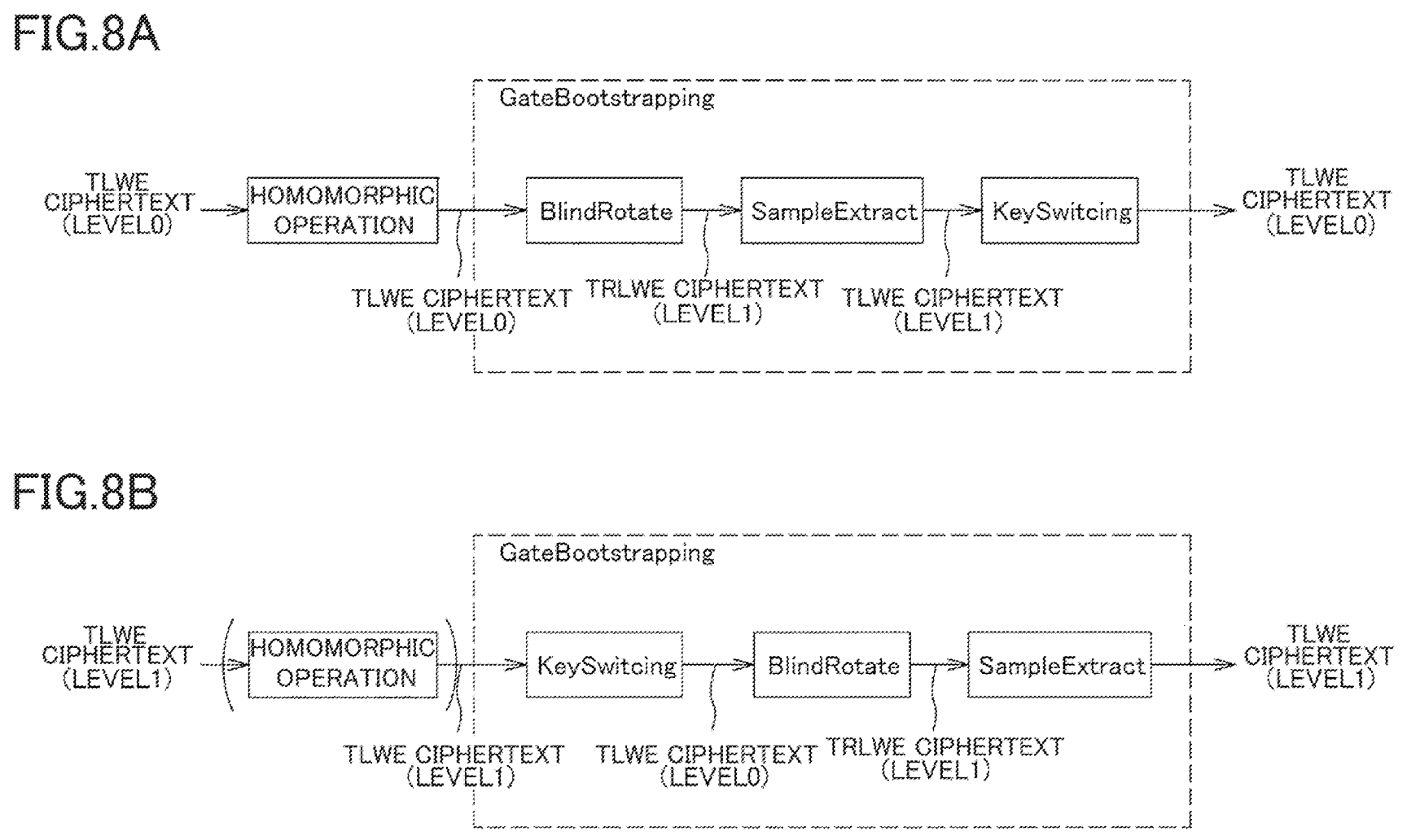

TLWE
CIPHERTEXT
(LEVEL0)

GateBootstrapping

HOMOMORPHIC
OPERATION

BlindRotate

SampleExtract

KeySwitcing

TLWE
CIPHERTEXT
(LEVEL0)

TRLWE CIPHERTEXT
(LEVEL1)

TLWE CIPHERTEXT
(LEVEL1)

TLWE
CIPHERTEXT
(LEVEL0)

FIG.8B

TLWE
CIPHERTEXT
(LEVEL1)

GateBootstrapping

HOMOMORPHIC
OPERATION

KeySwitcing

BlindRotate

SampleExtract

TLWE CIPHERTEXT
(LEVEL1)

TLWE CIPHERTEXT
(LEVEL0)

TRLWE CIPHERTEXT
(LEVEL1)

TLWE
CIPHERTEXT
(LEVEL1)

ENCRYPTION PROCESSING APPARATUS AND ENCRYPTION PROCESSING METHOD

CROSS-REFERENCE TO RELATED APPLICATION

This application is a continuation application of International Application PCT/JP2022/033394 filed on Sep. 6, 2022 and designated the U.S., the entire contents of which are incorporated herein by reference in their entirety.

FIELD

The embodiments discussed herein are related to an encryption processing apparatus, an encryption processing method, and a non-transitory computer-readable recording medium.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are known an additive homomorphic encryption that performs only an additive operation (addition and subtraction) while a finite cyclic group is regarded as an integer, and multiplicative homomorphic encryption that performs only a multiplicative operation (multiplication) while a finite cyclic group is regarded as an integer.

Since the finite cyclic group can be multiplied by an integer by repeating addition, a plaintext can be multiplied by an integer, and the plaintext can be exponentiated by repeating multiplication.

There is also known fully homomorphic encryption (FHE) that allows both an additive operation and a multiplicative operation to be performed while ciphertexts remain encrypted.

One of known fully homomorphic encryption techniques is fully homomorphic encryption based on the LWE (Learning with Errors) problem, which is configured by adding a small error to a plaintext in an encryption process to such an extent that there is no problem in decryption.

In fully homomorphic encryption based on the LWE problem, an error is accumulated as an operation is performed, and therefore bootstrapping for reducing an error component while the error component remains encrypted is performed before the error becomes too large to be decrypted.

The computation time of bootstrapping occupies most of the computation time included in fully homomorphic encryption. Further, the amount of computation is large in bootstrapping, because bootstrapping handles a large amount of data. Therefore, an operation of fully homomorphic encryption may not be able to obtain the operation result within a practical time.

A method for drastically improving this problem is TFHE (Fast Fully Homomorphic Encryption over the Torus) described in TFHE: Fast Fully Homomorphic Encryption over the Torus. Journal of Cryptology, 33:34-91, 2020, I.

Chillotti, N. Gama, M. Georgieva, and M. Izabachene (referred to as "Chillotti et al., 2020" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Chillotti et al., 2020 is the Bit-wise type.

However, a plaintext in TFHE is a real number from 0 to 1 associated with a circle group. Therefore, by dividing the range from 0 to 1 of the circle group into sections in an appropriate manner and associating the respective sections with integers in turn, TFHE can be applied as Integer-wise homomorphic encryption having an integer as its plaintext. For example, Integerwise Functional Bootstrapping on THE, 2020, Hiroki Okada, Shinsaku Kiyomoto, and Carlos Cid can be mentioned (referred to as "Okada et al., 2020" in the following descriptions).

If TFHE can be used as homomorphic encryption that can be subjected to four arithmetic operations in the Integer-wise type instead of the Bit-wise type, more efficient processing can be performed as compared with bit-by-bit computation.

The aforementioned paper states that a TLWE ciphertext used in TFHE is an additive homomorphic type for plaintexts on the circle group, and it is obvious that an additive (subtractive) operation can be performed.

Regarding multiplication, however, a multiplicative operation is not obvious because it is not defined on the circle group. It is demanded that multiplication between ciphertexts be made possible to make high speed evaluation and operation of a more complicated function possible.

It is an object of an aspect of the present invention to evaluate a complicated function in Integer-wise TFHE at high speed.

SUMMARY

According to an aspect of the embodiments, an encryption processing apparatus processes a ciphertext, the ciphertext being a fully homomorphic cyphertext that has, as a plaintext associated with an integer, a value obtained by adding an error with a predetermined variance to a predetermined value and that is able to be subjected to a predetermined operation between integers without being decrypted. The apparatus includes a processor that performs the following process. The processor performs a calculation process of applying a predetermined polynomial to a ciphertext to obtain a new ciphertext. The calculation process performs a first process of reducing an error of an input ciphertext by using the predetermined polynomial and a second process of extracting the new ciphertext from a ciphertext obtained as a result of the first process and computes the new ciphertext that is different in input value at high speed by executing the second process a plurality of number of times on the ciphertext obtained as the result of the first process.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIGS. 8A and 8B are diagrams illustrating ciphertexts input to and output from Gate Bootstrapping in the present embodiment.

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value logical operation.

Figure 1:
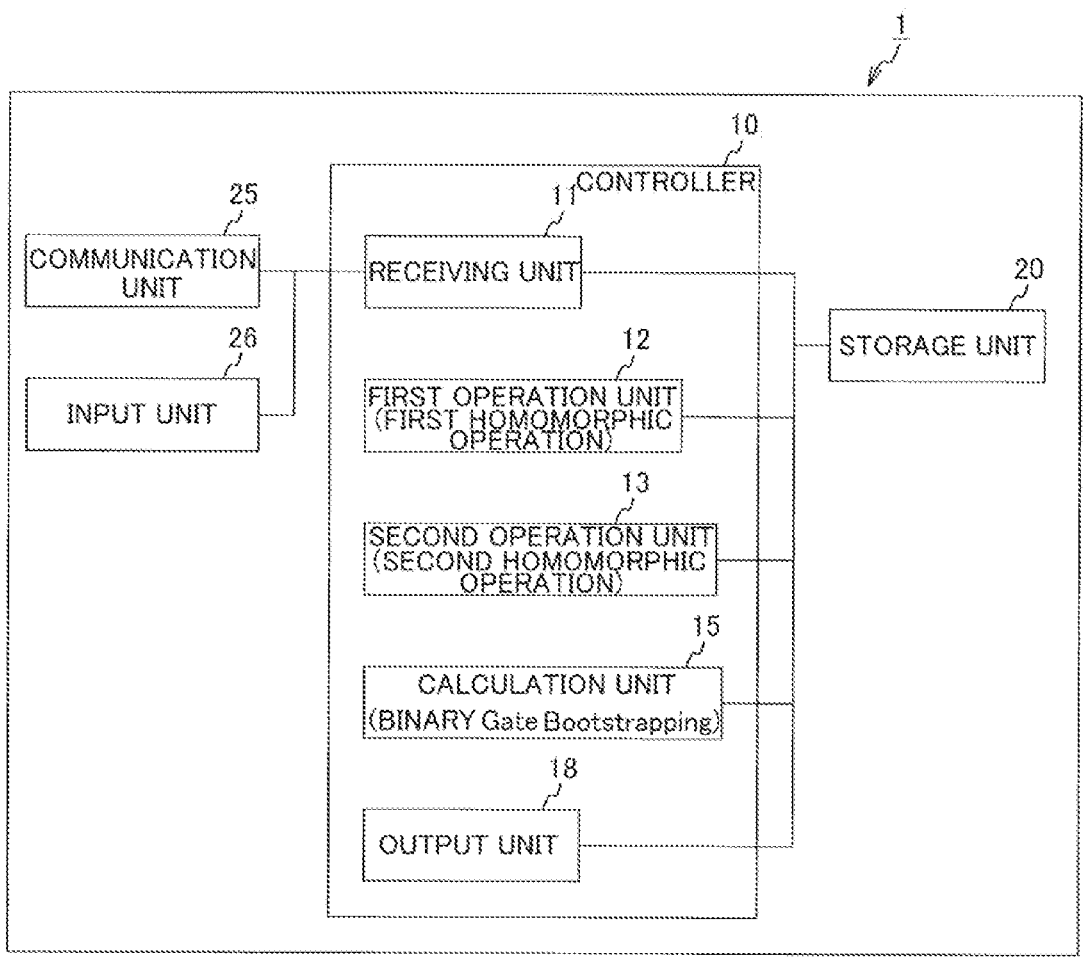
FIG. 1 is an explanatory diagram of a functional configuration of an encryption processing apparatus of the present embodiment.

FIG. 1 is an explanatory diagram of a functional configuration of an encryption processing apparatus of the present embodiment.

An encryption processing apparatus 1 includes a controller 10, a storage unit 20, a communication unit 25, and an input unit 26.

The controller 10 includes a receiving unit 11, a first operation unit 12, a second operation unit 13, a Bootstrapping unit (a calculation unit) 15, and an output unit 18.

The receiving unit 11 receives input of a ciphertext that is an object of an operation, via the communication unit 25 or the input unit 26. Alternatively, the receiving unit 11 receives input of a ciphertext from another process performed by the encryption processing apparatus 1.

The first operation unit 12 performs a first homomorphic operation on the input ciphertext received by the receiving unit 11.

The second operation unit 13 performs a second homomorphic operation on a ciphertext output from the Bootstrapping unit 15.

The first and second operation units 12 and 13 are arithmetic processors each of which implements a homomorphic operation (homomorphic multiplication) for polar coordinate inverse transformation described below by software.

The Bootstrapping unit 15 performs a Gate Bootstrapping process described below on the result of the operation by the first operation unit 12 to output a new ciphertext.

At least one of the first operation unit 12, the second operation unit 13, and the Bootstrapping unit 15 may be implemented by hardware.

The output unit 18 outputs a final operation result to outside of the encryption processing apparatus 1 or to another processing process performed by the encryption processing apparatus 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing apparatus 1 to a network, thereby enabling communication between the encryption processing apparatus 1 and an external device to be performed.

The encryption processing apparatus 1 can serve as a database server by storing the encrypted encryption database 60 in the storage unit 20 and including the communication unit 25.

In this case, the encryption processing apparatus 1 can receive an encrypted query from a terminal apparatus as the external device, search the encrypted encryption database 60, and send an encrypted search result to the terminal apparatus.

The input unit 26 inputs a ciphertext that is an object of arithmetic processing and a query for the encrypted database 60, to the encryption processing apparatus 1.

Figure 2:
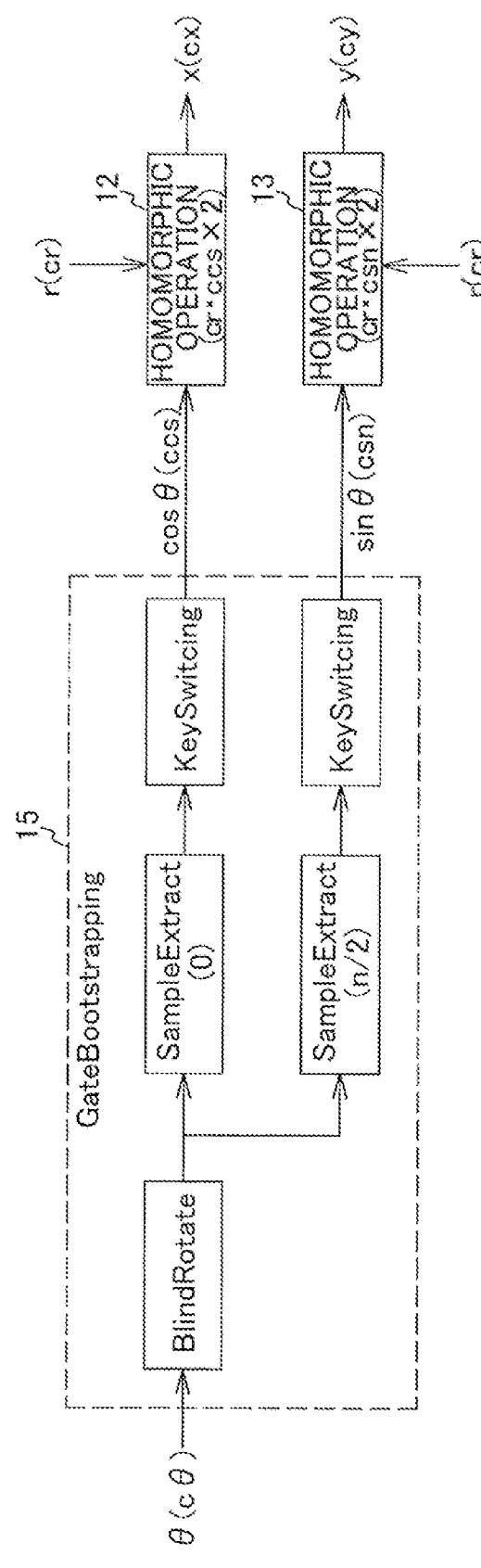
FIG. 2 is a detailed explanatory diagram of an operation process of an encryption processing apparatus based on the functional configuration in FIG. 1.

FIG. 2 is a detailed explanatory diagram of an operation process of an encryption processing apparatus based on the functional configuration in FIG. 1.

FIG. 2 illustrates an operation process of obtaining a ciphertext cx of an x-coordinate value and a ciphertext cy of a y-coordinate value from a ciphertext of a declination angle $\theta$ of a point P and a ciphertext of a distance r from the origin.

In the descriptions of FIG. 2, a ciphertext c$\theta$ input to the encryption processing apparatus 1 is a TLWE ciphertext described in the aforementioned paper.

The configuration illustrated in FIG. 2 uses (binary) Gate Bootstrapping presented in Chillotti et al., 2020. Gate Bootstrapping in TFHE presented in the aforementioned paper will be described in detail below.

In FIG. 2, the encryption processing apparatus 1 inputs the ciphertext c$\theta$ to the Bootstrapping unit 15 and performs Gate Bootstrapping.

In Gate Bootstrapping, the encryption processing apparatus 1 performs BlindRotate and then performs SampleExtract on a TRLWE ciphertext obtained by the BlindRotate at each of the position 0 and the position n/2.

The results of SampleExtract at the respective positions are a TLWE ciphertext ccs of cos $\theta\div2$ and a TLWE ciphertext csn of sin $\theta\div2$.

The encryption processing apparatus 1 performs homomorphic multiplication cr×ccs×2 on the TLWE ciphertext ccs and the TLWE ciphertext cr to obtain the ciphertext cx of the x-coordinate value.

Further, the encryption processing apparatus 1 performs homomorphic multiplication cr×csn×2 on the TLWE ciphertext csn and the TLWE ciphertext cr to obtain the ciphertext cy of the y-coordinate value.

The homomorphic multiplication performed by the encryption processing apparatus 1 here can be performed by using a two variable function disclosed in Okada et al., 2020.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 3:
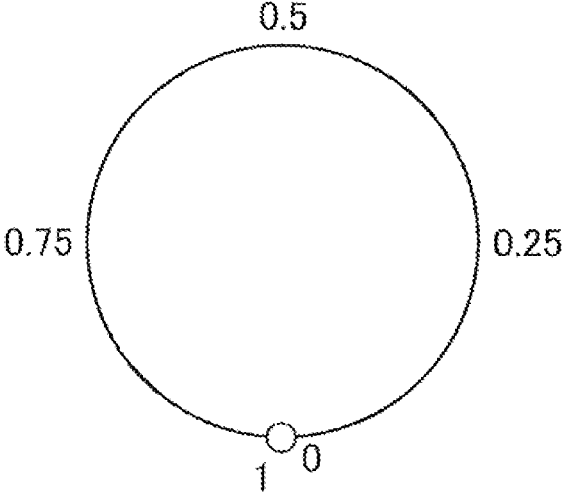
FIG. 3 is an image diagram for explaining a circle group that TLWE encryption has as a plaintext.

FIG. 3 is an image diagram for explaining a circle group that TLWE encryption has as a plaintext.

TLWE encryption has a real number that moves forward from 0 with a real number precision and, when reaching 1, returns to 0. TLWE encryption regards any point on a circle group $\{T\}$ illustrated in FIG. 5 as a plaintext, and uses a range near 0 (including an error) and a range near $\mu$ (including an error) as a plaintext.

The point on the circle group $\{T\}$ is also described as an "element" in the present specification.

An encryption processing apparatus handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group $\{T\}$. In addition, a private key [s] obtained by collecting N values that can be 0 or 1 is prepared.

Assuming that a random number in the Gaussian distribution (the normal distribution) in which an average value is a plaintext $\mu$ and a variance is preset to $\alpha$ is e, an example of a TLWE ciphertext is a pair $([a], [s] \cdot [a] + e)$.

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When $[s] \cdot [a] + e$ described above is written as b, the TLWE ciphertext can be represented as $([a], b)$.

A function $\varphi_s(([a], b) = b - [s] \cdot [a] = e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When $([a] + [a'], b + b')$ obtained by adding two TLWE ciphertexts $([a], b)$ and $([a'], b')$ together as they are is input to the aforementioned decryption function $\varphi_s$, a sum of the two plaintexts is obtained as represented by $$\varphi_s(([a] + [a'], b + b')) = (b + b') - [s] \cdot ([a] + [a']) =$$

$$(b - [s] \cdot [a]) + (b' - [s] \cdot [a']) = \varphi_s([a], b) + \varphi_s([a'], b').$$

It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a trivial ciphertext such as $([0], \mu)$ is a TLWE ciphertext that can be decrypted with any private key, that is, a ciphertext that can be decrypted with any private key to provide the same plaintext.

In $([0], \mu)$, $[0]$ represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext $([0], \mu)$, the private key [s] is multiplied by the zero vector [0] to disappear as represented by $\varphi_s(([0], \mu)) = \mu - [s] \cdot 0 = \mu$. The plaintext $\mu$ is thus obtained easily. Such a ciphertext is a trivial ciphertext with regard to the plaintext $\mu$.

A finite cyclic group used in Gate Bootstrapping in TFHE is described.

Gate Bootstrapping uses a factor ring of a polynomial ring as a finite cyclic group.

The following descriptions explain that a factor ring of a polynomial ring is a finite cyclic group.

An n-th degree polynomial is generally represented by $a_n X^n + a_{n-1} X^{n-1} + \ldots + a_0$.

These all sets form a commutative group for a sum of polynomials $f(x) + g(x)$.

Further, a product of polynomials $f(x)g(x)$ has properties identical to those of the commutative group except that an inverse element is not necessarily present. Such a structure is called "monoid".

Regarding the sum and the product of polynomials, the distributive property is established as follows.

$$f(x)\{g(x) + g'(x)\} = f(x)g(x) + f(x)g'(x)$$

Therefore, when the sum and the product of polynomials are defined using polynomials as elements, a "ring" is formed, which is called "polynomial ring".

TFHE uses a polynomial ring including the circle group $\{T\}$ as coefficients, and such a polynomial ring is represented as $T[X]$.

When a polynomial $T(X)$, which is a polynomial ring, is decomposed into $T[X](X^n + 1) + T[X]$, and only remainders are extracted and collected, a factor ring of a polynomial ring is obtained because the remainders also form a "ring".

In TFHE, a factor ring of a polynomial ring is represented as $T[X]/(X^n + 1)$.

A polynomial $F(X) = \mu X^{n-1} + \mu X^{n-2} + \ldots + \mu X + \mu$ is extracted by using a desired coefficient $\mu$ ($\mu$ belongs to T) as an element of the factor ring of the polynomial ring $T[X]/(X^n + 1)$.

When the element $F(X)$ of the factor ring of the polynomial ring is multiplied by X, $\mu X^{n-1} + \mu X^{n-2} + \ldots + \mu X - \mu$ is obtained, the coefficient of the top term appears as a constant term with a sign reversed from positive to negative.

When multiplication by X is further performed, the same phenomenon happens again as represented by $\mu X^{n-1} + \mu X^{n-2} + \ldots + \mu X^2 - \mu X - \mu$ (the coefficient of the top term appears as a constant term with a sign reversed from positive to negative).

When this multiplication is repeated n times, $-\mu X^{n-1} - \mu X^{n-2} \ldots - \mu X - \mu$ is obtained, so that the coefficients of all terms become negative.

When multiplication by X is further continued, the coefficient of the top term becomes positive from negative and appears as a constant term as represented by $$-\mu X^{n-1} - \mu X^{n-2} \ldots - \mu X + \mu,$$

$$-\mu X^{n-1} - \mu X^{n-2} \ldots + \mu X + \mu.$$

When multiplication by X is repeated $2n$ times in total, the multiplication result returns to the original element of the factor ring of the polynomial ring $F(X) = \mu X^{n-1} + \mu X^{n-2} + \ldots + \mu X + \mu$. As described above, the highest-order coefficient ($\mu$) appears as the lowest-order constant term with a reversed sign ($-\mu$), and terms are shifted by one in whole.

That is, the polynomial $F(X) = \mu X^{n-1} + \mu X^{n-2} + \ldots + \mu X + \mu$ is a finite cyclic group of order 2n in a ring that is the factor ring of the polynomial ring $T[X]/(X^n + 1)$.

In TFHE, an encryption processing apparatus achieves fully homomorphic encryption by using such properties of the polynomial F(X) based on a factor ring of a polynomial ring.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of a polynomial ring $T[X]/(X^n + 1)$ described above.

In order to obtain TRLWE encryption, elements of the factor ring of a polynomial ring $T[X]/(X^n + 1)$ are selected at random.

In fact, n coefficients in an (n−1)th degree polynomial are selected as uniformly distributed random numbers from the circle group {T}.

When the degree of the polynomial is n−1, the polynomial is not divided by $X^n + 1$, and it is not necessary to consider a remainder. Therefore, it is assumed that the (n−1)th degree polynomial is a polynomial a(X).

A polynomial s(X) used as a private key is structured as follows, by collecting n values each of which can be 0 or 1 at random.

$$s(X) = s_{n-1}X^{n-1} + s_{n-2}X^{n-2} + \ldots s_1 X + s_0$$

Assuming that n random numbers $e_i$ are random numbers in the Gaussian distribution (the normal distribution) in which an average value is a plaintext $\mu_i$ and a variance is $\alpha$, the following polynomial e(X) is structured from these random numbers.

$$e(X) = e_{n-1}X^{n-1} + e_{n-2}X^{n-2} + \ldots e_1 X + e_0$$

Decomposition of $s(X) \cdot a(X) + e(X)$ is performed into f(X) $(X^n + 1) + b(X)$, and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) is determined in such a manner that $\varphi_s$ becomes an element of $T[X]/(X^n + 1)$ serves as a decryption function, where $\varphi_s((a(X), b(X))) = b(X) - s(X) \cdot a(X) + g(X)(X^n + 1)$, as in TLWE encryption.

[Gadget Decomposition]

Gadget Decomposition is described.

Figure 5:
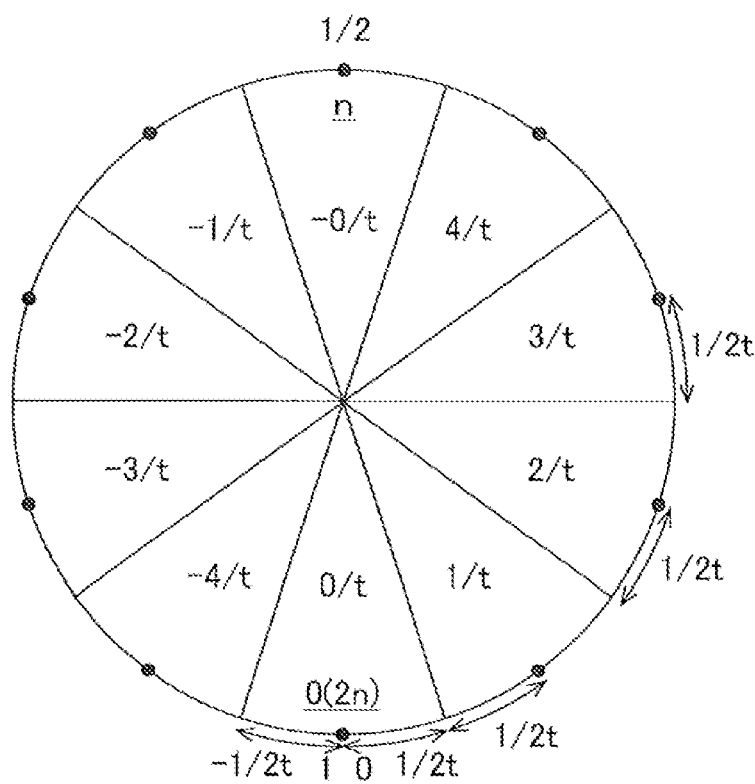
FIG. 5 is an explanatory diagram of TFHE applied to an Integer-wise type.

A coefficient in a polynomial used in a TRLWE ciphertext is a real number that is an element of the circle group {T} in FIG. 5 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial F(X) of a TRLWE ciphertext is 2, one unit of decomposition is $Bg = 2^2$, and decomposition into l=3 elements is performed. At this time, each element is arranged to enter between $-Bg/2$ and $Bg/2$.

A TRLWE ciphertext is a combination of two polynomials like (a(X), b(X)) as described above. Therefore, a TRLWE ciphertext d can be written as $$d = \left[ 0.75X^2 + 0.125X + 0.5, \, 0.25X^2 + 0.5X + 0.375 \right]$$

by being regarded as a two-dimensional vector having polynomials that serve as elements of a factor ring of a polynomial ring, as elements. Accordingly, in the following descriptions, each element is decomposed into the form of a sum of powers of $Bg^{-1} = 0.25$.

Since $0.75 = -0.25$ is established on the circle group {T}, decomposition can be performed as follows.

$$d = \left[ 0.75X^2 + 0.125X + 0.5, \right.$$

$$0.25X^2 + 0.5X + 0.375 \right] = \left[ -0.25X^2 + 0.125X + 0.5, \right.$$

$$0.25X^2 + 0.5X + 0.25 + 0.125 \right] = \left[ 0.25 \times \left( -X^2 + 2 \right) + 0.25^2 \times 2X + \right.$$

$$\left. 0.25^3 \times 0, \, 0.25 \times \left( X^2 + 2X + 1 \right) 9 + 0.25X^2 \times 2 + 0.25^3 \times 0 \right]$$

Therefore, when Gadget Decomposition is performed, a vector $$Dec(d) = \left[ -X^2 + 2, \, 2X, \, 0, \, X^2 + 2X + 1, \, 2, \, 0 \right]$$

is obtained.

An operator H of inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of inverse transform. A TRLWE ciphertext d' is obtained by performing an operation Dec(d)·H. The lower bits are rounded off.

It can also be said that an operation of obtaining [v] that makes $\|d-[v]\cdot H\|$ minimum with respect to the TRLWE ciphertext d is Gadget Decomposition. Here, $\|$ is a vector norm (length).

Ciphertexts $Z_i=(a(X), b(X))$ formed by polynomials in which all coefficients of $e(X)$ have an average value of 0 and a variance is a are created. The number of the created ciphertexts is 2l.

The plaintext μ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key [s] (Nth degree) used for TLWE ciphertexts, each element of a private key [s'] for encrypting the private key [s] is selected to be either of two values, i.e., 0 or 1 for use in Gate Bootstrapping.

It is necessary to make the degree of the private key [s'] the same as the degree n of polynomials used in TRLWE encryption.

The TRGSW ciphertext BK is created for each element of the private key [s].

When decryption with the private key [s'] is performed, 21 TRLWE ciphertexts $Z_j$ are created where $\varphi_s (Z_j)=0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts having this configuration are prepared, where N is the same as the degree of the private key [s]. A set of the thus prepared TRGSW ciphertexts is referred to as "Bootstrapping Key".

A cross product of the TRGSW ciphertext $BK_i$ and the TRLWE ciphertext d is defined as follows.

$BK_i \times d = Dec(d) \cdot BK_i$

Gadget Decomposition is an operation of obtaining [v] that makes $\|d-[v]\cdot H\|$ minimum with respect to the TRLWE ciphertext d.

Therefore, by using [v]=Dec(d) and an error $(\varepsilon_a(X), \varepsilon_b(X))$, [v]·H=d+$(\varepsilon_a(X), \varepsilon_b(X))$ can be written.

As a result, $BK_i \times d = Dec(d) \cdot BK_i$ $$= \hat{v} \cdot \begin{pmatrix} Z_1 \\ Z_2 \\ \vdots \\ Z_{2\ell} \end{pmatrix} + s_i \times \hat{v} \cdot H$$

is obtained.

When the left side calculates a dot product, and [v]·H=d+$(\varepsilon_a(X), \varepsilon_b(X))$ is substituted into the right side, $$= \sum\nolimits_{j=1}^{2\ell} v_j \times Z_j + s_i \times (d + (\epsilon_a(X), \epsilon_b(X)))$$

$$= \sum\nolimits_{j=1}^{2\ell} v_j \times Z_j + s_i \times d + s_i \times (\epsilon_a(X), \epsilon_b(X))$$

is obtained, and becomes the same as calculation of a sum of the following three ciphertexts c1, c2, and c3.

$$c_1 = \sum\nolimits_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_s(c_1)$ is 0.

In addition, $\varphi_s(c_3)$ obtained by decryption is set to be sufficiently small also in the subsequent operations, because the magnitude of the absolute value of a plaintext can be limited by a system parameter.

In this case, $\varphi_s(BK_i \times d)=\varphi_s(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1-d_0$ is substituted for d, and $d_0$ is finally added, the following CMux function is completed.

$$CMux(BK_i, d_0, d_1) = BK_i \times (d_1 - d_0) + d_0 = Dec(d_1 - d_0) \cdot BK_i + d_0$$

The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

Figure 4:
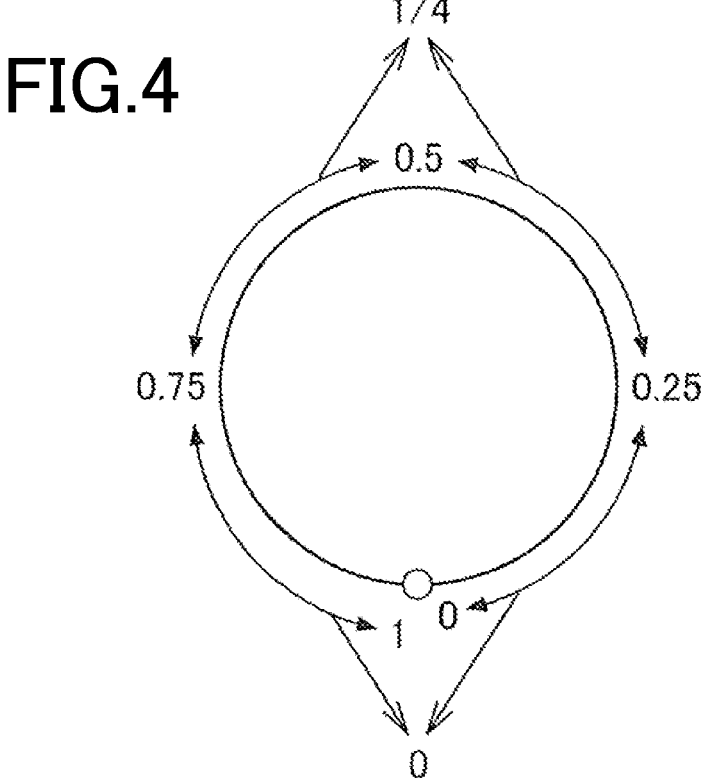
FIG. 4 is an operation image diagram of binary Gate Bootstrapping.

FIG. 4 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 ($\frac{1}{4}$) or 0.75 ($\frac{3}{4}$) to 1 on the circle group {T} in FIG. 3 is converted to a TLWE ciphertext 0, and a plaintext in a section from 0.25 ($\frac{1}{4}$) to 0.75 ($\frac{3}{4}$) is converted to a ciphertext 0.25 ($\frac{1}{4}$).

An error added to the plaintext in this conversion is any error in a range of $\pm\frac{1}{16}$.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$$T(X) = F(X) \cdot X^{n/2}$$

is prepared, which is obtained by multiplying the following polynomial F(X)

$$F(X) = \mu X^{n-1} + \mu X^{n-2} + \dots \mu X + \mu$$

where $\mu = \frac{1}{8}$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1'=\varphi_s(c')\approx 2n\times\varphi_s(c)=2n\mu 1$ is obtained. As n becomes larger, an error becomes smaller relatively.

A trivial TRLWE ciphertext (0, T(X)) whose plaintext is the polynomial T(X) is prepared, and it is assumed that $A_0=X^{-b'}\times(0, T(X))=(0, X^{-b'}\times T(X))$, where 0 indicates a 0th degree polynomial 0. Since b' is an integer, a power of X can be defined naturally.

Subsequently, $A_i=CMux(BK_i, A_{i-1}, X^{a'i}A_{i-1})$ is calculated in turn by using BK; that is the above-described Bootstrapping Key. Since a'i is an integer also in this expression, a power of X can be defined naturally.

Accordingly, the plaintext is not changed as it is when $s_i$ is 0, and multiplication by $X_{a'i}$ is performed in turn when $s_i$ is 1.

Therefore, when calculation is repeated as represented by $$\phi_{s'}(A_0) = X^{-b'} T(X)$$
$$\phi_{s'}(A_1) = X^{s_1 a'_1 - b'} T(X)$$
$$\phi_{s'}(A_2) = X^{s_2 a'_2 + s_1 a'_1 - b'} T(X)$$

then $$\phi_{s'}(A_n) = X^{\sum_{i=1}^{N} s_i \times a'_i - b'} T(X)$$

is obtained.

Here, $$\sum_{i=1}^{N} s_i \times a'_i - b'$$

is equal to the decryption function $\varphi_s(c')$ with a sign reversed. Therefore, $$\phi_{s'}(A_n) = X^{-\phi_s(c')} T(X)$$

is obtained. Here, $\varphi x'(A_n)$ is a ciphertext of a polynomial obtained by multiplying $\mu 1'$ times the polynomial T(X) by $X^{-1}$.

In association with the plaintext $\mu 1$ of the TLWE ciphertext c related to BlindRotate, unique values (up to 2n values including n coefficients and n values obtained by reversing the signs of the coefficients) in accordance with the number of times $\mu 1'$ (=$2n\mu 1$) of multiplying the polynomial T(X) by X is obtained, and therefore this can be regarded as a kind of Look Up Table.

(2) SampleExtract

In the plaintext polynomial $\varphi_s(A_n)$ obtained by decrypting the TRLWE ciphertext $A_n$ obtained by BlindRotate in (1), n/2$-\varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the TRLWE ciphertext $A_n$, the constant term is $\mu$ if $\varphi_s(c')$ is equal to or greater than n/2 and less than 3n/2, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials $$A(X) = \sum_{i=1}^{n} a_i X^{i-1}$$
$$B(X) = \sum_{i=1}^{n} b_i X^{i-1},$$

where n is the degree.

When decryption with the private key [s'] is performed, the expression can be expanded by putting a polynomial of the private key as $$S'(X) = \sum_{j=1}^{n} s'_j X^{j-1}.$$

Then, $$\phi_{s'}(c) = B(X) - S'(X) \cdot A(X) = \sum_{i=1}^{n} b_i X^{i-1} - \sum_{i=1}^{n} \sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)} =$$

$$\sum_{i=1}^{n} b_i X^{i-1} - \sum_{i=1}^{n} \sum_{j=i-1}^{n+i-2} a_i s'_{j-i+2} X^j =$$

$$\sum_{i=1}^{n} b_i X^{i-1} - \sum_{i=1}^{n} \sum_{j=i-1}^{n-1} a_i s'_{j-i+2} X^j - \sum_{i=1}^{n} \sum_{j=n}^{n+i-2} a_i s'_{j-i+2} X^j =$$

$$\sum_{j=1}^{n} b_j X^{j-1} - \sum_{j=0}^{n-1} \sum_{i=1}^{j+1} a_{i+1} s'_{j-i+2} X^j - \sum_{j=n}^{2n-2} \sum_{i=j-n+2}^{n} a_i s'_{j-i+2} X^j =$$

$$\sum_{j=0}^{n-1} b_{j+1} X^j - \sum_{j=0}^{n-1} \sum_{i=0}^{j} a_{i+1} s'_{j-i+1} X^j - \sum_{j=0}^{n-2} \sum_{i=j-n+1}^{-1} a_{i+n+1}$$

$$s'_{j-i+1} X^{j+n} = \sum_{j=0}^{n-2} b_{j+1} X^j + b_n X^{n-1} - \sum_{j=0}^{n-2} \sum_{i=0}^{j} a_{i+1} s'_{j-i+1} X^j -$$

$$\sum_{i=0}^{n-1} a_{i+1} s'_{n-i} X^{n-1} - \sum_{j=0}^{n-2} \sum_{i=j-n+1}^{-1} a_{i+n+1} s'_{j-i+1} X^{j+n} =$$

$$\sum_{j=0}^{n-2} \left( b_{j+1} X^j - \sum_{i=0}^{j} a_{i+1} s'_{j-i+1} X^j - \sum_{i=j-n+1}^{-1} a_{i+n+1} s'_{j-i+1} X^{j+n} \right) +$$

$$b_N X^{n-1} - \sum_{i=0}^{n-1} a_{i+1} s'_{n-i} X^{n-1}$$

Since this is "factor ring of polynomial ring", a remainder when this is divided by $(X^n+1)$ is calculated. Then, $$\sum_{j=0}^{n-2} \left( b_{j+1} X^j - \sum_{i=0}^{j} a_{i+1} s'_{j...i+1} X^j + \sum_{i=j-n+1}^{-1} a_{i+n+1} s'_{j-i+1} X^j \right) +$$

$$b_N X^{n-1} - \sum_{i=0}^{n-1} a_{i+1} s'_{n-i} X^{n-1} =$$

$$\sum_{j=0}^{n-2} \left( b_{j+1} - \sum_{i=0}^{j} a_{i+1} s'_{j-i+1} + \sum_{i=j-n+1}^{-1} a_{i+n+1} s'_{j-i+1} \right) X^j +$$

$$\left( b_n - \sum_{i=0}^{n-1} a_{i+1} s'_{n-i} \right) X^{n-1}$$

is obtained.

Further, when $$a'_i = \begin{cases} a_i & (i \geq 1) \\ -a_{i+n} & (\text{otherwise}) \end{cases}$$

is put, then $$= \sum_{j=0}^{n-2} \left( b_{j+1} - \sum_{i=0}^{j} a'_{i+1} s'_{j-i+1} - \sum_{i=j-n+1}^{-1} a'_{i+1} s'_{j-i+1} \right) X^j + \left( b_N - \sum_{i=0}^{n-1} a'_{i+1} s'_{n-i} \right) X^{n-1}$$

$$= \sum_{j=0}^{n-2} \left( b_{j+1} - \sum_{i=j-n+1}^{j} a'_{i+1} s'_{j-i+1} \right) X^j + \left( b_N - \sum_{i=0}^{n-1} a'_{i+1} s'_{n-i} \right) X^{n-1}$$

$$= \sum_{j=0}^{n-2} \left( b_{j+1} - \sum_{i=0}^{n-1} a'_{i+j-n+2} s'_{n-i} \right) X^j + \left( b_n - \sum_{i=0}^{n-1} a'_{i+1} s'_{n-i} \right) X^{n-1}$$

$$= \sum_{j=0}^{n-1} \left( b_{j+1} - \sum_{i=0}^{n-1} a'_{i+j-n+2} s'_{n-i} \right) X^j$$

is obtained, and coefficients of respective terms in a plaintext polynomial are obtained from $$\phi_{s'}(c) = \sum_{j=0}^{n-1} \left( b_{j+1} - \sum_{i=0}^{n-1} a'_{i+j-n+2} s'_{n-i} \right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = \alpha'_{-i+2}$$

is put, the extracted coefficient can be transformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a''} = \phi_{s'}\left( \vec{a''}, b_1 \right).$$

That is, when coefficients are extracted from the TRLWE ciphertext $A_n = (A(X), B(X))$ obtained by BlindRotate in (1) while the coefficients are set as $$a''_i = \begin{cases} a_1 & (i = 1) \\ -a_{-i+n+2} & (\text{otherwise}) \end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext is the output of SampleExtract and has either of two types, i.e., $-\mu$ or $\mu$ as a plaintext.

A TLWE ciphertext cs=([a"], $b_1$)+([0], $\mu$) obtained by adding a trivial ciphertext ([0], $\mu$) of which plaintext is $\mu$ to the thus obtained TLWE ciphertext is obtained.

Specifically, since $\mu$ is $\frac{1}{8}$ in the polynomial F(X) as a test vector, a ciphertext of $-\frac{1}{8}$ or $\frac{1}{8}$ is obtained in this stage.

When a trivial TLWE ciphertext ([0], ⅛) of which a plaintext is μ=⅛ is added to the output result of SampleExtract, $$-1/8 + 1/8 = 0$$

$$1/8 + 1/8 = 1/4$$

are established, and thus a new TLWE ciphertext cs having either of two values, i.e., 0 or ¼ as a plaintext is obtained.
(3) KeySwitching The TLWE ciphertext cs obtained by using SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s_i' \times 2^{-1} s_i' \times 2^{-2} s_i' \times 2^{-3} \dots .$$

The private key is [s]. A "number of digits" t is a system parameter.

When decryption is performed with the private key [s], $$\phi_S(KS_{i,j}) = s_i' \times 2^{-j}$$

is obtained. This is a "KeySwitching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers one by one, the elements can be written in the following form.

$$a_i \approx \sum_{j=1}^{t} a_{i,j} \times 2^{-j}$$

Although an error is increased in this stage, the maximum value of the absolute value can be limited by a system parameter.

As main processing of KeySwitching, the following TLWE ciphertext cx is calculated.

$$cx = (\vec{0}, b) - \sum_{i=1}^{n} \sum_{j=1}^{t} a_{i,j} \times KS_{i,j}$$

Since the term ([0], b) is a trivial ciphertext, this term is b when being decrypted. A result of decryption of the TLWE ciphertext cx is calculated as follows.

$$\phi_s(cx) = b - \sum_{i=1}^{n} \sum_{j=1}^{t} a_{i,j} \times s_i' \times 2^{-j} = b - \sum_{i=1}^{n} \sum_{j=1}^{t} s_i' \times a_{i,j} \times 2^{-j}$$

Since s'$_i$ is a constant for j, it is factored out as follows.

$$= b - \sum_{i=1}^{n} s_i' \sum_{j=1}^{t} a_{i,j} \times 2^{-j}$$

The expression obtained by decomposition into fixed-point numbers descried above is then substituted.

$$\approx b - \sum_{i=1}^{n} s_i' \times a_i = \phi_{s'}((\vec{a}, b)) = \phi_{s'}(c_s)$$

As a result, $$\phi_s(cx) \approx \phi_{s'}(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\varphi_s(cx)$ is 0 when $\varphi_s(c)$ is in a range of ±¼, and is ¼ when $\varphi_s(c)$ is in a range of ½±¼.

By the processing described above, a TLWE ciphertext is obtained as a result of Gate Bootstrapping, which is either of two values, i.e., 0 or ¼ and has any error within ±¹⁄₁₆.

The maximum value of the error does not depend on the TLWE ciphertext c that is the input, and is a value fixed by a system parameter.

Therefore, the system parameter is set in such a manner that the maximum value of the error is any value within ±¹⁄₁₆ that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within ±¹⁄₁₆.

The processing described above is processing of Gate Bootstrapping in TFHE.

As described above, TFHE is Bit-wise type homomorphic encryption that has zero or non-zero as a plaintext and enables a logical operation to be performed. However, the plaintext is a real number from 0 to 1 associated with the circle group {T}, as described with reference to FIG. 3. Therefore, by associating sections obtained by dividing the circle group {T} with integers in turn, TFHE can be applied as Integer-wise type homomorphic encryption having an integer as a plaintext.

The aforementioned paper states that a TLWE ciphertext used in TFHE is additive homomorphic for plaintexts on a circle group, and it is obvious that the TLWE ciphertext used in TFHE can be subjected to addition (subtraction).

Further, multiplication is made possible by the method described below. When multiplication is made possible, TFHE can more fully be used as homomorphic encryption that can be subjected to four arithmetic operations in the Integer-wise type. Accordingly, more efficient processing can be performed as compared with bit-by-bit computation in Bit-wise TFHE.

FIG. 5 is an explanatory diagram of TFHE applied to the Integer-wise type.

As illustrated in FIG. 5, the range from 0 to 1 associated with the circle group {T} is divided into t. For a TLWE ciphertext, possible values of a plaintext are t values obtained by dividing the range from 0 to 1, i.e., from $-(t/2)$ to $(t/2)-1$, and $(t/2)-1$ is the maximum value of the integer that can be stored in one TLWE ciphertext.

As illustrated in FIG. 5, assuming that t is set to 10 and the range from 0 to 1 is divided into 10, a ciphertext can represent integers of $-5, -4, -3, -2, -1, 0, 1, 2, 3$, and 4.

In this case, these integer values are respectively assigned to sections obtained by dividing the range from 0 to 1 of the circle group {T} by t=10, i.e., sections of $-4/t, -3/t, -2/t, -1/t, -0/t, 4/t, 3/t, 2/t, 1/t$, and $0/t$.

As illustrated in FIG. 5, 0 (1) on the circle group {T} is in a region from $-\frac{1}{2}t$ to $\frac{1}{2}t$. Regarding the plaintext of a ciphertext on the circle group {T}, the position in the region (the position on the circle group {T}) can be adjusted by adding or subtracting an offset based on, for example, $\frac{1}{2}t$, as necessary.

When the value of t is increased and the circle group {T} is divided more finely, the integer value that can be recorded in a TLWE ciphertext can be increased. However, too fine division of the circle group makes the range of an error to be added to the plaintext too small, causing an issue of decrease in the encryption strength. This point will be described later.

An example of an operation process using Integer-wise TFHE is described below.

The encryption processing apparatus 1 of the present embodiment transforms coordinates of a desired point expressed in polar coordinates (a distance from the origin, a disclination angle) by Integer-wise TFHE (TLWE ciphertexts) to orthogonal coordinates (a coordinate plane) using two variables (an x-coordinate value, a y-coordinate value). In the following descriptions, transformation of polar coordinates to orthogonal coordinates may simply be referred to as "polar coordinate inverse transformation".

To transform encrypted polar coordinate values to encrypted orthogonal coordinate values without decrypting, an operation of a trigonometric function by Integer-wise TFHE is required as described below.

The following descriptions are made as to how to perform an operation of polar coordinate inverse transformation and, as an example of high-speed evaluation of a complicated function using Integer-wise TFHE, how to speed up the operation of the trigonometric function.

Figure 6A:
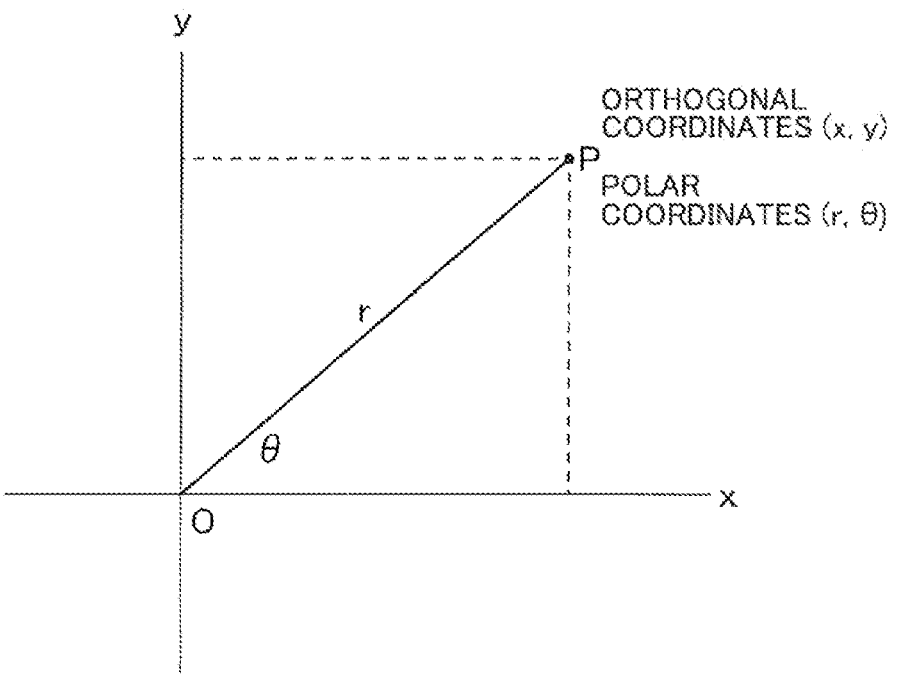
FIGS. 6A and 6B are explanatory diagrams of a position of a point on a plane.

FIG. 6A is an explanatory diagram of the position of a point on a plane.

The position of a point P can be expressed in orthogonal coordinates or polar coordinates as illustrated in FIG. 6A.

The orthogonal coordinates express the position of the point P on the plane by using the x-coordinate value and the y-coordinate value in the form of (x, y). The polar coordinates express the position of the point P on the plane by using a distance r from the origin O and the declination angle $\theta$ in the form of (r, $\theta$). The declination angle $\theta$ is an angle of rotation measured counterclockwise from a half line that passes through the origin O and is used as a reference (e.g., the positive x-axis).

The encryption processing apparatus 1 transforms polar coordinates to orthogonal coordinates by using four arithmetic operations in Integer-wise TFHE. In particular, when the polar coordinates of the point P are encrypted by Integer-wise TFHE, the encryption processing apparatus 1 performs transformation to orthogonal coordinates (an x-coordinate value, a y-coordinate value) while keeping the polar coordinates encrypted.

Figure 6B:
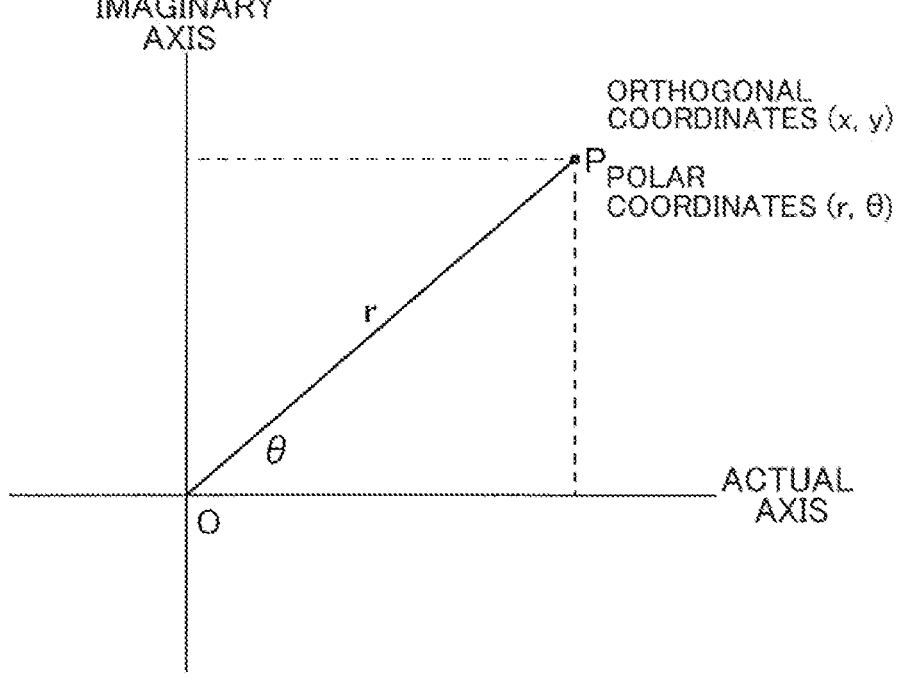

Similarly to the position of the point P on the plane, a complex number can be expressed in the form of a real part+an imaginary part (x, y) or polar coordinates (r, $\theta$) on a complex plane (the Gaussian plane), as illustrated in FIG. 6B. The method of polar coordinate transformation in the present embodiment can be applied to transformation of a complex number onto a complex plane.

In complex number computation, an operation can be sped up by regarding a complex number as a point on the Gaussian plane and causing multiplication between complex numbers to reach rotation and scaling on the Gaussian plane, as is well known.

It is very useful that the method of the present embodiment can transform a complex number expressed in polar coordinates to the form of a real part+an imaginary part while keeping the complex number encrypted.

Normally, the following two operations are performed in order to transform polar coordinates to orthogonal coordinates.

(Operation 1) Calculate sin $\theta$ and cos $\theta$ from the declination angle $\theta$ of the point P.

(Operation 2) Multiply each of sin $\theta$ and cos $\theta$ by the distance r from the origin O. The x-coordinate value and the y-coordinate value of the position P can be obtained from r·cos $\theta$ and r·sin $\theta$, respectively.

The following descriptions are made as to how to perform (Operation 1) and (Operation 2) described above on a ciphertext in order to transform polar coordinates to orthogonal coordinates while keeping the ciphertext encrypted.

As illustrated in FIG. 5, the encryption processing apparatus 1 sets the number t by which the range from 0 to 1 of the circle group {T} is divided. Since computation of the square is performed, $\sqrt{(t-1)}$ is the maximum value of the integer that can be recorded in one TLWE ciphertext as an x-coordinate value or a y-coordinate value, which is different from $(t/2)-1$ described in FIG. 5. Here, $t-1$ is a resolution of a ratio of x to y and is also an operational precision in polar coordinate transformation. Further, $\pi/(2t)$ is a resolution of the declination angle $\theta$.

In addition, the encryption processing apparatus 1 sets system parameters in TFHE.

The procedure is unchanged from the aforementioned paper. However, the degree n of a polynomial in TRLWE encryption (the polynomial F(X) as a test vector) is preferably a multiple of 2t. Further, the encryption processing apparatus 1 sets the system parameters in such a manner that a range of an error to be added to a plaintext in a ciphertext obtained after Gate Bootstrapping is less than $\pm 1/(16t)$.

Furthermore, in a case where a test vector polynomial is set as $$T(X) = \sum_{i=0}^{n-1} f(i)X^i,$$

it is preferable that f(i) satisfies f(i)=−f(i−2n) when i is 0 to n−1.

For example, a cosine function corresponds to this function. Specifically, if f(x) is set as $$f(x) = \cos\left(\frac{\pi}{n}x\right),$$

the above property is satisfied.

The procedure of polar coordinate inverse transformation is described with reference to FIG. 2.

It is assumed that there are a TLWE ciphertext cθ of the declination angle θ and a TLWE ciphertext cr of the distance r.

The TLWE ciphertext cθ and the TLWE ciphertext cr respectively correspond to the declination angle θ of the point P and the distance r of the point P from the origin, which both cannot be known without a private key.

An error range is made smaller than in the case of FIG. 5, and the circle group {T} is finely divided. Specifically, 1/(8t) is set as one section (slice). It can be said that a slice of 1/t in FIG. 5 is further divided. Subsequently, the plaintext θ (0° to 360°) is mapped on the range from 0 to 1 of the circle group {T}.

The TLWE ciphertext cθ has $$\frac{\left\lfloor \frac{8t}{2\pi}\theta \right\rfloor}{8t}$$

as its plaintext.

In relation to (Operation 1), the encryption processing apparatus 1 (the calculation unit 15) performs, as Gate Bootstrapping, BlindRotate on the TLWE ciphertext cθ by using the following test vector polynomial T1(X).

$$T1(X) = \sum_{i=0}^{4t-1} \left( \frac{\left\lfloor t \times \cos\left(\frac{2\pi}{8t}i\right) \right\rfloor}{2t} \right)\left( \sum_{j=0}^{\frac{n}{4t}-1} X^{\frac{n}{t}i+j} \right)$$

The test vector polynomial T1(X) applies the method of operating a univariate function described above and sets the results of a function $$\left\lfloor t \times \cos\left(\frac{2\pi}{8t}i\right) \right\rfloor$$

that obtains cos θ from the declination angle θ as its coefficients.

As a result of BlindRotate, the encryption processing apparatus 1 obtains a TRLWE ciphertext having $$\frac{\left\lfloor t \times \cos\left(\frac{2\pi}{8t}\left\lfloor \frac{8t}{2\pi}\theta \right\rfloor\right) \right\rfloor}{2t} \approx \frac{\lfloor t \times \cos\theta \rfloor}{2t}$$

as its plaintext.

The encryption processing apparatus 1 (the calculation unit 15) performs SampleExtract on the thus obtained TRLWE ciphertext at the position 0 and performs Key- Switching on a TLWE ciphertext obtained by SampleExtract, thereby obtaining the TLWE ciphertext ccs corresponding to cos θ.

Further, the encryption processing apparatus 1 (the calculation unit 15) performs SampleExtract on the same TRLWE ciphertext at the position n/2 and performs Key-Switching on a TLWE ciphertext obtained by SampleExtract, thereby obtaining the TLWE ciphertext csn corresponding to sin θ.

The TLWE ciphertext csn has $$\frac{\left\lfloor t \times \cos\left(\frac{2\pi}{8t}\left(\left\lfloor \frac{8t}{2\pi}\theta \right\rfloor + 2t\right)\right) \right\rfloor}{2t} \approx \frac{\left\lfloor t \times \cos\left(\theta + \frac{\pi}{2}\right) \right\rfloor}{2t}$$

as its plaintext.

As described above, the TLWE ciphertext cθ of the declination angle θ maps the plaintext θ (0° to) 360° on the range from 0 to 1 of the circle group {T}. Therefore, the position obtained by shifting the phase from cos θ by 90° (π/2) corresponds to n/2 on the circle group. By performing SampleExtract at the position n/2, the TLWE ciphertext csn of sin θ can be obtained.

As a property of trigonometric functions which is related to the shift in phase described above, $$\cos\left(\theta + \frac{\pi}{2}\right) = -\sin\theta$$

is established. Therefore, the above plaintext of the TLWE ciphertext csn $$\frac{\left\lfloor t \times \cos\left(\theta + \frac{\pi}{2}\right) \right\rfloor}{2t}$$

can be approximated to $$\frac{\lfloor -t \times \sin\theta \rfloor}{2t}.$$

Consequently, the TLWE ciphertext ccs and the TLWE ciphertext csn respectively corresponding to cos θ and sin θ of the point P can be obtained by one BlindRotate.

The present embodiment performs SampleExtract a plurality of number of times (twice) for one BlindRotate to obtain sin θ and cos θ at the same time, thereby increasing the operation speed. Functions that are different from each other only in input value can be evaluated at high speed.

Without performing BlindRotate on each of a test vector polynomial for obtaining sin θ and a test vector polynomial for obtaining cos θ, both the computation results can be obtained by one BlindRotate.

The encryption processing apparatus 1 performs an operation of a univariate function that obtains the TLWE ciphertexts respectively having cos θ and sin θ as plaintexts from θ at the same time as Gate Bootstrapping using the test vector polynomial T1(X).

This fact is substantially equivalent to the fact that two times of Gate Bootstrapping are performed in a time for one, because BlindRotate accounts for a large part of the processing time of Gate Bootstrapping.

KeySwitching is performed on the result of SampleExtract at each position, similarly to Gate Bootstrapping in the aforementioned paper. Since SampleExtract and KeySwitching consume very little of the processing time of Gate Bootstrapping, the influence on the computation time is small.

Due to the configuration described above, the number of times of BlindRotate that consumes almost all the computation time in an operation in a logic element can be reduced to one.

BlindRotate occupies most of the processing time in Gate Bootstrapping in TFHE. Therefore, by obtaining cos θ and sin θ in one BlindRotate, the processing time can be reduced by nearly half.

The encryption processing apparatus 1 (the first operation unit 12) multiplies the TLWE ciphertext cr of the distance r by the TLWE ciphertext ccs in a homomorphic manner and further performs multiplication by 2 in a manner corresponding to (Operation 2). The x-coordinate value of the position P can thus be obtained.

Further, the encryption processing apparatus 1 (the second operation unit 13) multiplies the TLWE ciphertext cr of the distance r by the TLWE ciphertext csn×(−1) in a homomorphic manner and further performs multiplication by 2. The y-coordinate value of the position P can thus be obtained.

The homomorphic multiplication (cr×ccs and cr×csn) performed by the encryption processing apparatus 1 can be performed by using the method disclosed in Okada et al., 2020.

The encryption processing apparatus 1 thus completes polar coordinate inverse transformation.

In the above descriptions, the method of transforming polar coordinates to orthogonal coordinates expressed by an x-coordinate value and a y-coordinate value has been described. A complex number expressed in polar coordinates on a complex plane can be transformed to the form of a real part+an imaginary part.

According to the present embodiment, TFHE can be used as homomorphic encryption that can be subjected to four arithmetic operations in the Integer-wise type instead of the Bit-wise type, so that more efficient processing can be performed as compared with bit-by-bit computation.

[Homomorphic Multiplication Between Ciphertexts]

The encryption processing apparatus 1 performs homomorphic multiplication between integer ciphertexts by evaluation of a two-variable function using (1) homomorphic multiplication between an integer ciphertext and a binary ciphertext and (2) a homomorphic match test between a ciphertext and a constant, as described below.

The description is provided as to (1) homomorphic multiplication between an integer ciphertext and a binary ciphertext and (2) a homomorphic match test between a ciphertext and a constant.

(1) Multiplication between an integer ciphertext cy and a binary ciphertext cc by a binary multiplication unit can be performed in the following manner, for example.

In the present embodiment, the range from 0 to 1 associated with the circle group {T} is divided into t as illustrated in FIG. 5, and the ciphertext cy is a ciphertext of 0 to (t/2)−1.

The ciphertext cc has $\frac{1}{2}$ as a plaintext and corresponds to t/2 in integer, when the ciphertext cc is the symbol 0. The ciphertext cc has 0 as a plaintext and corresponds to 0 in integer, when the ciphertext cc is the symbol 1.

To perform multiplication between the integer ciphertext cy and the binary ciphertext cc, two univariate functions $f_{id}$ and $f_{half}$ are used as elements of Gate Bootstrapping.

To calculate a univariate function on an encrypted integer value, a method can be used which is obtained by extending Gate Bootstrapping in Chillotti et al., 2020. This extended method is described in "Bootstrapping in FHEW-like Cryptosystems, Danniele Micciancio and Yuriy Polyakov, Duality Technologies, Feb. 23, 2020". The method in this paper does not set a constant μ as coefficients of a test vector but sets a function result, thereby obtaining different results depending on the value of a TLWE ciphertext.

The univariate function $f_{id}$ outputs, for the ciphertext cy of the integer 0 to (t/2)−1 input thereto, a ciphertext of the same integer 0 to (t/2)−1.

In a test vector $T_{id}(X)$ for executing a univariate function fid simultaneously with BlindRotate, $$
\begin{cases}
\mu_0, \ldots, \mu_{\left\lfloor \frac{n}{t} \right\rfloor} & := \dfrac{f_{id}(0)}{t} = 0. \\[2mm]
\mu_{\left\lfloor \frac{(2i-1)n}{t} \right\rfloor+1}, \ldots, \mu_{\left\lfloor \frac{(2i+1)n}{t} \right\rfloor} & := \dfrac{f_{id}(i)}{t} = \dfrac{i}{t}, \text{ for } i = 1, \ldots, t/2-1. \\[2mm]
\mu_{n-\left\lfloor \frac{n}{t} \right\rfloor}, \ldots, \mu_{n-1} & := \dfrac{-f_{id}(0)}{t} = 0.
\end{cases}
$$

are set as coefficients of respective orders from 0-th order to (n−1)th order.

A univariate function $f_{half}$ is a function calculating, for the ciphertext cy of the integer 0 to (t/2)−1 input thereto, cy/2 when the plaintext integer is an even number and −(cy+1)/2−((t/2)−1)/2 otherwise.

In a test vector $T_{half}(X)$ for executing the univariate function $f_{half}$ simultaneously with BlindRotate, $$
\begin{cases}
\mu_0, \ldots, \mu_{\left\lfloor \frac{n}{t} \right\rfloor} & := \dfrac{f_{half}(0)}{t} = 0. \\[2mm]
\mu_{\left\lfloor \frac{(2i-1)n}{t} \right\rfloor+1}, \ldots, \mu_{\left\lfloor \frac{(2i+1)n}{t} \right\rfloor} & := \dfrac{f_{half}(i)}{t}, \text{ for } i = 1, \ldots, t/2-1. \\[2mm]
\mu_{-\left\lfloor \frac{n}{t} \right\rfloor}, \ldots, \mu_{n-1} & := \dfrac{-f_{half}(0)}{t} = 0.
\end{cases}
$$

are set as coefficients of respective orders from 0-th order to (n−1)th order.

First, the encryption processing apparatus 1 performs a homomorphic operation between the TLWE ciphertext cc that is a binary ciphertext and the TLWE ciphertext cy that is an integer ciphertext.

The encryption processing apparatus 1 performs Gate Bootstrapping on the result of the homomorphic operation as input by using the above test vector polynomial $T_{id}(X)$ to obtain a temporary ciphertext $c_{tmp}$.

When the TLWE ciphertext cc is a ciphertext of t/2 (symbol 0), the result of cc+cy is a ciphertext of y/t+½, and the plaintext of the TLWE ciphertext cy is rotated to a position symmetrical with respect to the origin. The plaintext of the ciphertext $c_{tmp}$ after Gate Bootstrapping using the test vector polynomial $T_{id}(X)$ is moved to a bilaterally symmetrical position. The ciphertext $c_{tmp}$ is a ciphertext obtained by reversing the sign of the ciphertext cy.

When the TLWE ciphertext cc is a ciphertext of 0 (symbol 1), the result of cc+cy is a ciphertext of y/t, and the plaintext of the ciphertext $c_{tmp}$ after Bootstrapping remains the same as the plaintext of the ciphertext cy.

The encryption processing apparatus 1 then performs a homomorphic operation of the ciphertext cy+the ciphertext $c_{tmp}$.

When the TLWE ciphertext cc is the ciphertext of 0 (symbol 1), the result of the homomorphic operation of the ciphertext cy+the ciphertext $c_{tmp}$ is the ciphertext cy+the ciphertext cy.

When the TLWE ciphertext cc is the ciphertext of t/2 (symbol 0), the result of the homomorphic operation of the ciphertext cy+the ciphertext $c_{tmp}$ is a ciphertext $c_0$ having 0 as a plaintext.

The encryption processing apparatus 1 performs Gate Bootstrapping by using the above test vector polynomial $T_{half}(X)$ on the result of the homomorphic addition as input. As a result of Gate Bootstrapping, the cyphertext cy+the ciphertext cy is converted to the ciphertext cy, and the ciphertext $c_0$ remains the ciphertext $c_0$.

When the TLWE ciphertext cc by which the integer ciphertext cy is multiplied is the ciphertext of 0, the ciphertext cy is obtained by Gate Bootstrapping. When TLWE ciphertext cc is the ciphertext of t/2, the ciphertext $c_0$ is obtained.

By the configuration described above, the encryption processing apparatus 1 can perform multiplication between the integer ciphertext cy and the binary ciphertext cc.

(2) Homomorphic Match Test Between Ciphertext and Constant

A match test between an integer ciphertext and a plaintext integer is described.

A case for an integer ciphertext $c_{m1}$ and a plaintext integer m2 is described as an example.

The ciphertext $c_{m1}$ has an integer of 0 to (t/2)−1 as its plaintext m1. The plaintext integer m2 is an integer of 0 to (t/2)−1.

The encryption processing apparatus 1 performs a homomorphic operation of the ciphertext $c_{m1}$−(0, m2/t) and performs Gate Bootstrapping on the operation result as input by using a test vector polynomial of which coefficients are $$\begin{cases} \mu_0, \cdots, \mu_{\lfloor \frac{n}{t} \rfloor} & := \dfrac{t/2}{t} = \dfrac{1}{2}, \\ \mu_{\lfloor \frac{n}{t} \rfloor + 1}, \cdots, \mu_{n - \lfloor \frac{n}{t} \rfloor - 1} := 0, \\ \mu_{n - \lfloor \frac{n}{t} \rfloor}, \cdots, \mu_{n-1} & := \dfrac{t/2}{t} = -\dfrac{1}{2} \end{cases},$$

where (0, m2/t) is a trivial ciphertext having m2/t as a plaintext.

A new ciphertext cd obtained as a result of Gate Bootstrapping is a binary ciphertext indicating whether the ciphertext and the constant match each other, and has t/2 (½ as the value on the circle group) as a plaintext when $\varphi(c_{m1})$=m2±ε (ε is an error) and 0 as a plaintext when $\varphi(c_{m1})$≠m2±ε.

The encryption processing apparatus 1 performs homomorphic multiplication between integer ciphertexts by evaluation of a two-variable function using (1) the homomorphic multiplication between an integer ciphertext and a binary ciphertext and (2) the homomorphic match test between a ciphertext and a constant. Here, the encryption processing apparatus 1 processes a two-variable function f(x, y)=x×y.

A case for the integer ciphertext $c_{m1}$ and an integer ciphertext $c_{m2}$ is described below.

The ciphertext $c_{m1}$ has an integer of 0 to (t/2)−1 as a plaintext m1.

The ciphertext $c_{m2}$ has an integer of 0 to (t/2)−1 as a plaintext m2.

m1 and m2 are integers from 0 to (t/2)−1, and the two-variable function outputs, for input of the ciphertext $c_{m1}$ of the integer of 0 to (t/2)−1 and the ciphertext $c_{m2}$ of the integer of 0 to (t/2)−1, a ciphertext of the same integer of 0 to (t/2)−1.

Multiplication between integers can be performed by adding a multiplicand for the number of times equal to a multiplier. To perform multiplication between encrypted integers in a homomorphic manner while keeping them encrypted, the encryption processing apparatus 1 performs processing described below.

It is assumed that a ciphertext indicating the multiplication result is a ciphertext $c_{sum}$.

The encryption processing apparatus 1 substitutes 0 as an initial value for the ciphertext $c_{sum}$ and also substitutes 0 as an initial value for a variable i indicating the number of repetitions.

The encryption processing apparatus 1 generates a function Fi(y)=i×y when one variable in F(x, y)=x×y is fixed to i, and also generates a test vector polynomial Ti(X) in this case. A coefficient μ of each term of Ti(X) is a value of i×y using the section y corresponding to the order of that term. A dividend is subjected to Bootstrapping using this polynomial Ti(X), whereby a ciphertext ce is obtained. The ciphertext ce has the result of multiplication of the dividend×i as a plaintext.

The encryption processing apparatus 1 performs a test to check whether a multiplier and the value of the variable i match each other by using the above method of the homomorphic match test between a ciphertext and a constant.

According to the above method, the ciphertext cd is obtained which has t/2 as a plaintext when the multiplier and the variable i match each other and θ as a plaintext when the multiplier and the variable i do not match each other.

The encryption processing apparatus 1 multiplies the integer ciphertext ce by the binary ciphertext cd by using the above method of homomorphic multiplication between an integer ciphertext and a binary ciphertext described above. The encryption processing apparatus 1 multiplies a multiplicand by t/2 when the multiplier and the variable i match each other and multiplies the multiplicand by 0 when the multiplier and the variable i do not match each other.

The encryption processing apparatus 1 performs Gate Bootstrapping using a test vector polynomial executing the above univariate function $f_{id}$, on the result of adding this operation result to the ciphertext $c_{sum}$ that is the multiplication result as input.

The above processes are repeated t/2 times while the variable i is incremented (while increasing y, that is, the value of the plaintext of the multiplier) (where t/2 is the number of integers of 0 or more that a ciphertext can take as its plaintext). The result of repetition of the above processes is the result of multiplication between integer ciphertexts.

In the above descriptions, by assuming the multiplicand and the multiplier as the TLWE ciphertext cr and the TLWE ciphertext ccs (csn), respectively, the x-coordinate value and the y-coordinate value described in the example can be calculated, for example. Same holds true for assuming the multiplicand and the multiplier as the TLWE ciphertext ccs (csn) and the TLWE ciphertext cr, respectively according to the commutative law.

Figure 7:
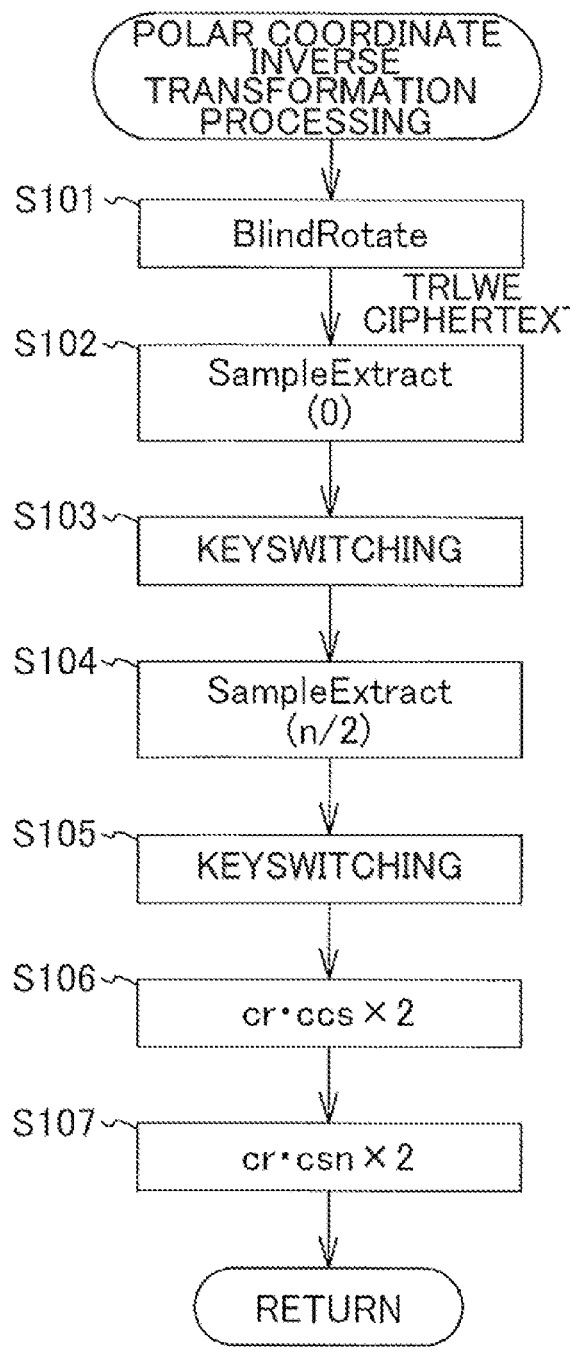
FIG. 7 is a flowchart for explaining a process of polar coordinate inverse transformation in the present embodiment.

FIG. 7 is a flowchart for explaining a process of polar coordinate inverse transformation in the present embodiment.

The encryption processing apparatus 1 (the calculation unit 15) performs BlindRotate on the TLWE ciphertext cθ as input at Step S101.

The encryption processing apparatus 1 (the calculation unit 15) performs SampleExtract on a TRLWE ciphertext obtained as a result of BlindRotate, at the position 0 at Step S102.

The encryption processing apparatus 1 (the calculation unit 15) performs Key Switching to obtain the TLWE ciphertext ccs of cos θ at Step S103.

The encryption processing apparatus 1 (the calculation unit 15) performs SampleExtract on the TRLWE ciphertext obtained as a result of BlindRotate, at the position n/2 at Step S104.

The encryption processing apparatus 1 (the calculation unit 15) performs KeySwitching to obtain the TLWE ciphertext csn of sin θ at Step S105.

The encryption processing apparatus 1 (the first operation unit 12) performs homomorphic multiplication between the TLWE ciphertext cr and the TLWE ciphertext ccs and further performs multiplication by 2, thereby obtaining the ciphertext cx of the x-coordinate value at Step S106.

The encryption processing apparatus 1 (the second operation unit 13) performs homomorphic multiplication between the TLWE ciphertext cr and the TLWE ciphertext csn and further performs multiplication by 2, thereby obtaining the ciphertext cy of the y-coordinate value at Step S107.

By the processes described above, cos θ and sin θ are obtained from the declination angle θ of the point P, so that the polar coordinates (r, θ) of the point P can be transformed to the orthogonal coordinates (x, y).

FIGS. 8A and 8B are diagrams illustrating ciphertexts input to and output from Gate Bootstrapping in the present embodiment.

In the above descriptions, Gate Bootstrapping has been described as being performed in the order of BlindRotate, SampleExtract, and KeySwitching as illustrated in FIG. 8A.

The order is not limited thereto. First, KeySwitching can be performed in Gate Bootstrapping, as illustrated in FIG. 8B, and thereafter BlindRotate and SampleExtract can be performed.

There are concepts of levels for TLWE ciphertexts in accordance with the security strength.

In Gate Bootstrapping in FIG. 8A, TLWE ciphertexts as input and output are at LEVEL0. BlindRotate is performed for the LEVEL0 TLWE ciphertext, and a TLWE ciphertext obtained by SampleExtract for a TRLWE ciphertext that is the output of BlindRotate becomes a LEVEL1 ciphertext. However, as a result of KeySwitching, the LEVEL0 TLWE ciphertext is output.

Meanwhile, in the method illustrated in FIG. 8B, TLWE ciphertexts input to and output from Gate Bootstrapping are set at LEVEL1, and the level of the input ciphertext is lowered to LEVEL0 by KeySwitching first. BlindRotate is then performed, and SampleExtract is performed for a TRLWE ciphertext that is the output of BlindRotate. Consequently, the LEVEL1 TLWE ciphertext is output.

In FIGS. 8A and 8B, Gate Bootstrapping is performed on the result of the homomorphic operation performed on the input TLWE ciphertext. However, in the present embodiment, Gate Bootstrapping may be performed directly on the input TLWE ciphertext, as described with reference to FIG. 2. In this case, the homomorphic operation before Gate Bootstrapping is not necessarily required.

The LEVEL0 ciphertext is formed by an N-th order vector [a] of elements on the circle group {T} encrypted with an N-th order private key [s]. Meanwhile, the LEVEL1 ciphertext obtained as a result of SampleExtract is formed by an n-th order vector [a'] of elements on the circle group {T} encrypted with an n-th order private key [s'].

Since the LEVEL0 ciphertext is less than the LEVEL1 ciphertext in the number of coefficients that determine the difficulty of the LWE problem (the order of the vector), the amount of computation of homomorphic addition is less than that at LEVEL1.

Meanwhile, the LEVEL0 ciphertext has a problem that its security strength tends to be lowered when an acceptable error added to the plaintext is made smaller. This is because in LWE encryption, the safety is guaranteed by the error added to the plaintext.

As for TLWE encryption, as the error added the plaintext becomes larger and the number of the coefficients (the order of the vector) is larger, computation (decryption) is more difficult.

In other words, as for TLWE encryption, as the error added to the plaintext is smaller and the number of coefficients (the order of the vector) is smaller, computation (decryption) is easier.

In particular, in TFHE applied to the Integer-wise type, it is necessary to divide the range from 0 to 1 of the circle group {T} more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure the security by increasing the number of coefficients (the order of the vector) in the ciphertext.

In order to ensure the security of the ciphertext that is easy to calculate (decipher) by reducing the error added to the plaintext, it is desirable to move KeySwitching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by KeySwitching as input.

Further, making an error to be added to a plaintext smaller has a problem of an error in decryption in addition to the above-described problem of security strength.

As described above, in TFHE applied to Integer-wise type, the range from 0 to 1 associated with the circle group {T} is divided into t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a device to which the present embodiment is applied.

Application Example

The processing performed by the encryption processing apparatus 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing apparatus 1 is a database sever that manages the encrypted database, receives a query encrypted by TLWE encryption from a terminal apparatus connected thereto via a network or the like, and returns a response to the query which is encrypted by TLWE encryption to the terminal apparatus.

Since an index cannot be created in the encrypted database, it is necessary to perform comparison and aggregation for the entire database.

The encryption processing apparatus 1 performs a comparison operation that compares all records in the encrypted database with a query by the functions of the first operation unit 12, the second operation unit 13, and the Bootstrapping unit 15.

The comparison operation is to perform subtraction between a ciphertext of a record and a ciphertext of a query, and the sign of the subtraction result is equivalent to the comparison operation.

The encryption processing apparatus 1 can further perform an aggregate operation for records that match the query in the comparison operation.

In the aggregate operation, the encryption processing apparatus 1 adds the records that match the query in the comparison operation to calculate a total and the like.

As described above, processing of the query to the encrypted database requires an operation such as addition, subtraction, and multiplication between integers configuring ciphertexts and/or comparison (the comparison is equivalent to whether the subtraction result is positive or negative). In a case of using Bit-wise ciphertexts, it is considered that the processing frequently performs a full adder operation. When the bit length of the integer handled becomes larger, the number of full adders required is also increased.

Four arithmetic operations are homomorphic four arithmetic operations with respect to encrypted numerical values that are regarded as ciphertexts of respective bits when a permutation using an input ciphertext is expressed in binary.

By performing an operation and/or comparison between Integer-wise ciphertexts each having an integer as its plaintext without using a full adder, a query execution time can be significantly reduced.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption.

In addition, the Euclidean distance is often used for comparison in fuzzy authentication and fuzzy search. When the Euclidean distance is calculated, calculation of a square is required. Therefore, in Bit-wise type homomorphic encryption, O $(N^2)$ full adders must be caused to operate with respect to the bit length of data when multiplication is performed. Even in a comparison operation by simple subtraction, it is necessary to operate O (N) full adders.

By performing an operation between Integer-wise ciphertexts each having an integer as its plaintext without using a full adder, a processing time required for fuzzy authentication or fuzzy search can be largely reduced.

Figure 9:
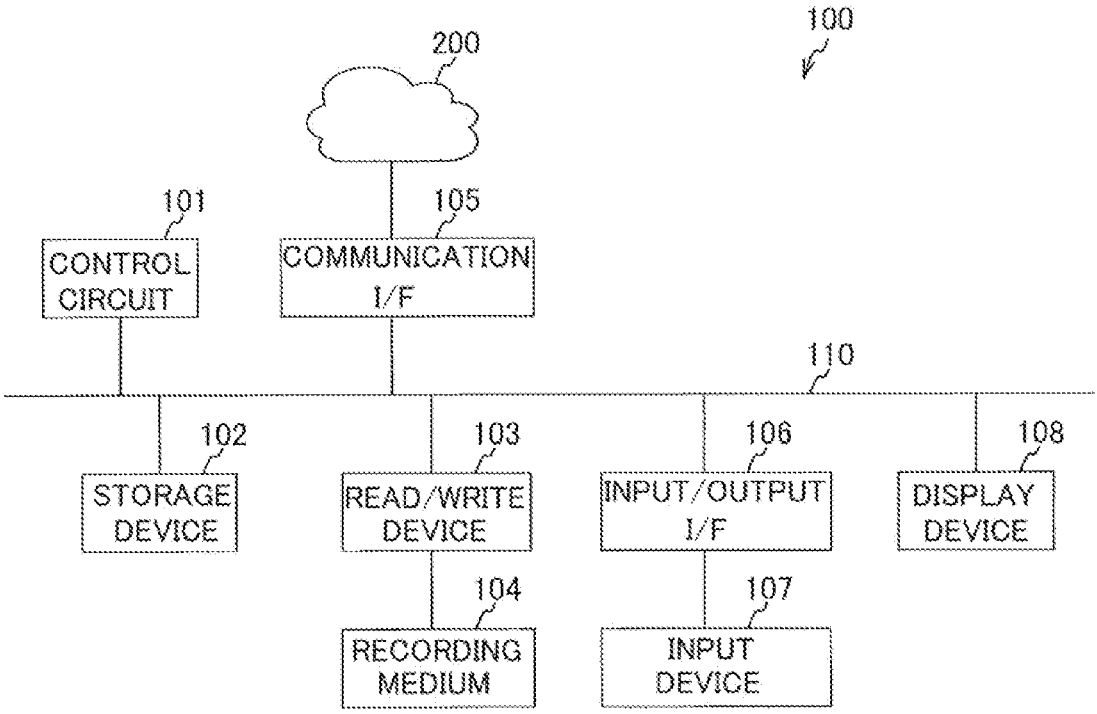
FIG. 9 is a block diagram illustrating an example of a computer apparatus.

FIG. 9 is a block diagram illustrating an example of a computer apparatus.

A configuration of a computer apparatus 100 is described with reference to FIG. 9.

The computer apparatus 100 is, for example, an encryption processing apparatus that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing apparatus 1 can be configured by selecting a part of or all elements from the constituent elements incorporated in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 2, for example.

The storage device 102 stores various types of data therein. For example, the storage device 102 is a memory such as a Read Only Memory (ROM) and a Random Access Memory (RAM), or a non-transitory computer-readable recording medium such as a Hard Disk (HD) and a Solid State Drive (SSD). The storage device 102 may store therein an information processing program that causes the control circuit 101 to function as the controller 10 in FIG. 2. The storage device 102 functions as the storage unit 20 in FIG. 2, for example. The information processing program is a program for making a processor perform a process of encrypting a ciphertext, for example.

The encryption processing apparatus 1 loads a program stored in the storage device 102 into a RAM when performing information processing.

The encryption processing apparatus 1 executes the program loaded to the RAM by the control circuit 101, thereby performing processing that includes at least one of a receiving process, the first operation process, the second operation process, the first Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-transitory computer-readable recording medium such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer apparatus 100 and another apparatus to each other via the network 200 in a communicable manner. The communication interface 105 functions as the communication unit 25 in FIG. 2, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer apparatus 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 2, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer apparatus 100 to other apparatuses.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing apparatus that processes a ciphertext, the apparatus comprising:
a processor that performs a calculation process of applying a predetermined polynomial to a fully homomorphic ciphertext to obtain a new ciphertext, the ciphertext being the fully homomorphic ciphertext that has, as a plaintext associated with an integer, a value obtained by adding an error with a predetermined variance to a predetermined value and the fully homomorphic ciphertext is able to be subjected to a predetermined operation between integers without being decrypted, wherein the calculation process performs:
a first process of reducing an error of an input ciphertext by using the predetermined polynomial, and
a second process of extracting the new ciphertext from a ciphertext obtained as a result of the first process, wherein the processor improves speed of computation of computes the new ciphertext that is different in input value at high speed by performing the second process a plurality of number of times on a ciphertext obtained as the result of the first process,
wherein the predetermined operation is an operation of transforming coordinates of a point on a plane from polar coordinates to orthogonal coordinates;
the calculation process
performs the first process on a first ciphertext that is input corresponding to a declination angle θ of the point to obtain a second ciphertext,
performs the second process on the second ciphertext at a first position to obtain a third ciphertext corresponding to cos θ, as the new ciphertext, and
performs the second process on the second ciphertext at a second position to obtain a fourth ciphertext corresponding to sin θ, as the new ciphertext; and
the processor further
performs homomorphic multiplication between the third ciphertext and a fifth ciphertext that is input corresponding to a distance from an origin to obtain a sixth ciphertext corresponding to an x-coordinate value, and
performs homomorphic multiplication between the fourth ciphertext and the fifth ciphertext to obtain a seventh ciphertext corresponding to a y-coordinate value.

2. The encryption processing apparatus according to claim 1, wherein the calculation process preforms a process of reducing a number of coefficients of the ciphertext, prior to obtaining a new ciphertext.

3. The encryption processing apparatus according to claim 1, wherein the process performed by the processor performs the predetermined operation to perform a process involved in fuzzy authentication or fuzzy search using the input ciphertext that is input.

4. The encryption processing apparatus according to claim 1, wherein the processor further performs the predetermined operation to process a query based on the input ciphertext to an encrypted database that is input.

5. An encryption processing method, executed by a processor, of processing a ciphertext, the method comprising:

a calculation process of applying a predetermined polynomial to a fully homomorphic ciphertext to obtain a new ciphertext, the ciphertext being the fully homomorphic ciphertext that has, as a plaintext associated with an integer, a value obtained by adding an error with a predetermined variance to a predetermined value and the fully homomorphic ciphertext is able to be subjected to a predetermined operation between integers without being decrypted, wherein the calculation process performs a first process of reducing an error of an input ciphertext by using the predetermined polynomial; and a second process of extracting the new ciphertext from a ciphertext obtained as a result of the first process, wherein speed of computation of computes the new ciphertext that is different in input value at high speed is improved by performing the second process a plurality of times on a ciphertext obtained as the result of the first process, wherein the predetermined operation is an operation of transforming coordinates of a point on a plane from polar coordinates to orthogonal coordinates;

the calculation process performs the first process on a first ciphertext that is input corresponding to a declination angle $\theta$ of the point to obtain a second ciphertext, performs the second process on the second ciphertext at a first position to obtain a third ciphertext corresponding to cos $\theta$, as the new ciphertext, and performs the second process on the second ciphertext at a second position to obtain a fourth ciphertext corresponding to sin $\theta$, as the new ciphertext; and the processor further performs homomorphic multiplication between the third ciphertext and a fifth ciphertext that is input corresponding to a distance from an origin to obtain a sixth ciphertext corresponding to an x-coordinate value, and performs homomorphic multiplication between the fourth ciphertext and the fifth ciphertext to obtain a seventh ciphertext corresponding to a y-coordinate value.

6. A non-transitory computer-readable recording medium storing a program for causing a processor to perform an encryption process of processing a ciphertext, the encryption process including:

a calculation process of applying a predetermined polynomial to a fully homomorphic ciphertext to obtain a new ciphertext, the ciphertext being the fully homomorphic ciphertext that has, as a plaintext associated with an integer, a value obtained by adding an error with a predetermined variance to a predetermined value and the fully homomorphic ciphertext is able to be subjected to a predetermined operation between integers without being decrypted, wherein the calculation process performs a first process of reducing an error of an input ciphertext by using the predetermined polynomial; and a second process of extracting the new ciphertext from a ciphertext obtained as a result of the first process, wherein the processor improves speed of computation of computes the new ciphertext that is different in input value at high speed by performing the second process a plurality of number of times on a ciphertext obtained as the result of the first process, wherein the predetermined operation is an operation of transforming coordinates of a point on a plane from polar coordinates to orthogonal coordinates;

the calculation process performs the first process on a first ciphertext that is input corresponding to a declination angle $\theta$ of the point to obtain a second ciphertext, performs the second process on the second ciphertext at a first position to obtain a third ciphertext corresponding to cos $\theta$, as the new ciphertext, and performs the second process on the second ciphertext at a second position to obtain a fourth ciphertext corresponding to sin $\theta$, as the new ciphertext; and the processor further performs homomorphic multiplication between the third ciphertext and a fifth ciphertext that is input corresponding to a distance from an origin to obtain a sixth ciphertext corresponding to an x-coordinate value, and performs homomorphic multiplication between the fourth ciphertext and the fifth ciphertext to obtain a seventh ciphertext corresponding to a y-coordinate value.

* * * * *